Figure 1:
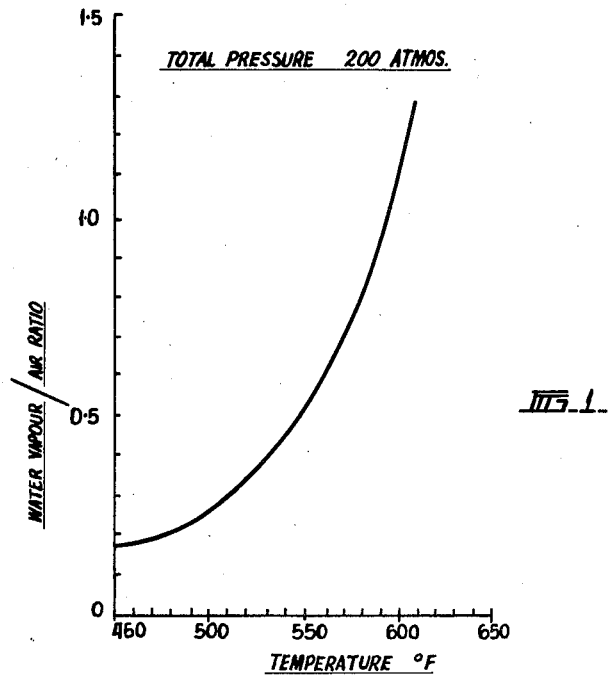

Sept. 21, 1965 C. M. SAUL 3,207,572
WET COMBUSTION OF WASTE LIQUORS
Filed Sept. 10, 1962 2 Sheets-Sheet 2

United States Patent Office

3,207,572
Patented Sept. 21, 1965

3,207,572
WET COMBUSTION OF WASTE LIQUORS
Charles Michael Saul, Burnie, Tasmania, Australia, assignors to Associated Pulp and Paper Mills Limited, Melbourne, Victoria, Australia, a corporation of Australia
Filed Sept. 10, 1962, Ser. No. 222,264
Claims priority, application Australia, Sept. 12, 1961, 9,100/61
6 Claims. (Cl. 23—49)

This invention relates to improvements in the wet combustion of waste liquors containing combustible organic materials and recoverable sodium values, and refers especially to improvements in the wet combustion of black liquor obtained from the soda process for the pulping of wood.

It is known that certain types of waste liquors, such as those from the sulphite pulping process, and sewage wastes, which contain combustible organic materials in aqueous solution or dispersion, may be treated by a wet combustion process in which an oxygenating gas, such as air, is introduced into the solution or dispersion, while the system is maintained at a predetermined temperature up to the critical temperature of water and at a predetermined superatmospheric pressure, whereby oxidation of the combustible organic materials is effected. In this specification and in the claims the term "air" includes oxygen, oxygen-enriched air and other oxygenating gases.

To the best of the applicant's knowledge the above-mentioned process has not been successfully applied, at least on a commercial scale, to the treatment of waste liquors from the soda pulping process, although the successful application of the process to such liquors, if it could be achieved, would offer considerable advantages over the methods at present used for the treatment of such liquors.

It is an object of the present invention to provide improvements in the said wet combustion process which will enable waste liquors from the soda pulping process to be effectively treated. In the case of waste liquors (e.g., black liquor) from the soda process for the pulping of wood, it is found that a large proportion of the principal inorganic constituent present, namely sodium, is combined with organic materials extracted from the wood during the pulping process, such as lignin or related humic substances or organic acids of the type of acetic acid, and that a further proportion of the sodium may be in the form of sodium carbonate and/or bicarbonate. If such liquors are subjected to an oxygenating treatment of the kind described one effect of the process is to substantially convert the sodium-organic compounds, in the first instance at least, to sodium carbonate. Applicant has also found that, due to the presence of excess carbon dioxide and under the conditions of temperature and pressure which obtain, a substantial proportion of the sodium carbonate is converted to sodium bicarbonate, the extent of such conversion depending on the equilbrium conditions established in the system, the principal factors being the sodium ion concentration, partial pressure of carbon dioxide, and the temperature in the system.

The main purpose of the treatment of the black liquor is to recover its sodium values in the form of sodium hydroxide, for use in subsequent pulping operations, and one method of achieving this is to subject the solution, obtained after the oxygenating treatment, to a causticisation treatment using calcium hydroxide. However, a serious economic disadvantage arises in regard to the causticisation of the solutions, the sodium content of which is substantially in the form of sodium bicarbonate, due to the fact that sodium bicarbonate requires approximately twice as much calcium hydroxide to convert it to sodium hydroxide as is required to produce the same amount of sodium hydroxide from sodium carbonate.

An important feature of the present invention resides in substantially reducing the proportion of sodium bicarbonate in the residual solution from the oxygenating treatment, whereby the consumption of calcium hydroxide required for causticisation is substantially lowered.

Applicant's studies of the wet oxidation of soda-based black liquor have confirmed that considerable amounts of sodium bicarbonate are present in the residual solutions, and that the bicarbonate content of such solutions can be lowered very substantially by a novel method which, in addition to achieving this result, also possesses several concomitant advantages.

In carrying out the wet oxidation of waste liquors, preheated oxygenating gas, usually air, together with the preheated waste liquor, are introduced into a pressure vessel wherein the oxidation takes place under defined conditions of high temperature and high pressure. The oxidised liquor is then separated from the gas and water vapour in a suitable separator, and after heat exchange the solution, if it contains any recoverable inorganic residues, is then subjected to a chemical recovery treatment.

In the application of the wet combustion process to black liquor from the soda pulping process, the sodium content of the liquor is substantially converted during the oxidation to sodium carbonate and sodium bicarbonate. There is a high partial pressure of carbon dioxide in the reactor and separator and this carbon dioxide is in equilibrium with the sodium carbonate and sodium bicarbonate, but the relative amounts of sodium carbonate and sodium bicarbonate in the hot solution are not readily determined. In addition, large amounts of carbon dioxide, possibly more than equivalent to the total sodium, are in solution or fine dispersion in the aqueous phase. The proportion of dissolved carbon dioxide and thereby the actual or potential formation of sodium bicarbonate depends on the partial pressure of carbon dioxide and the temperature obtaining in the equilibrium between the gaseous and liquid phases at the point of separation and to some extent on the completeness with which physical phase separation can be made in practice. Applicant has discovered in practice that it is difficult to achieve theoretically perfect separation and it follows that any carbon dioxide remaining physically dispersed in the liquid phase in addition to that in true solution will form increasing proportons of sodium bicarbonate as the effluent liquor is subsequently cooled and in particular when cooled under pressure for purposes of heat recuperation.

Applicant has also discovered that if the separated sodium carbonate-bicarbonate solution be transferred directly to a second pressure vessel, whilst still at its maximum temperature or at a suitable high temperature below the maximum temperature and under the total pressure of the system, its carbon dioxide content may be greatly reduced by first passing the air required for oxidation through this liquor, preferably in a countercurrent operation.

One effect of this procedure is to substantially lower the partial pressure of the carbon dioxide in the second vessel, which will be called the decomposer, and to carry forward the carbon dioxide, liberated from solution, with the air stream.

The amount of carbon dioxide so liberated represents a small proportion only of the oxygenating gas stream which then passes on to the oxidation reactor. The effect of this dilution of the oxygenating gas with carbon dioxide on the reaction kinetics in the said reactor is negligible, and further, since the solution in the reactor, at the completion of the reaction, can be regarded as substantially saturated with the carbon dioxide, derived from the oxidation of the carbon of the organic constituents of the liquor, an amount of carbon dioxide substantially equivalent to that derived from the decomposer unit remains in the gaseous phase. It then leaves the system via the separator after the separation of the gaseous and liquid phases.

The removal of dissolved or dispersed carbon dioxide from the oxidised solution in the decomposer achieves the objective of the invention, that is, to reduce the tendency to formation of sodium bicarbonate, and thereby reduces the requirement of calcium hydroxide in the subsequent causticisation treatment, and the method of the invention has the following additional advantages.

Any tendency to form sodium bicarbonate in the wet combustion system imposes limitations on the concentration of sodium salts which can be tolerated in the system and discharged from the system without crystallisation since sodium bicarbonate is much less soluble than sodium carbonate. Practically, it has been found that this imposes definite limitations on the operation of the system in regard to the concentration of the effluent solutions. After causticisation these solutions may be too weak for reuse in pulping unless concentrated by evaporation.

In the method of this invention, the air passing through the decomposer evaporates a considerable amount of water and the latent heat of vaporisation is absorbed from the solution. The solution is thereby cooled and concentrated. In practice, the evaporation may be so great that a quantity of make-up water to control the ultimate concentration in the decomposer is required.

This evaporated water and heat carried forward in the oxygenating-gas stream which now contains air, water vapour and a small proportion of carbon dioxide, can then be heat exchanged to provide both the preheat for the reactor and the necessary dilution in the reactor. With black liquor of the concentration usually obtained in the mill of Associated Pulp and Paper Mills Ltd., at Burnie, Tasmania, it has been found that this liquor requires dilution with water as it enters the reactor in an approximately 1:1 ratio, and a further advantage of this invention is that this dilution is partly or wholly obtainable from the water in the entering oxygenating-gas, thus reducing or eliminating the addition of water into the system at this point. It will also be appreciated that the oxygenating gas is simultaneously preheated to the desired degree.

There is another advantage of the method of this invention. Constituents of soda process black liquor which are oxidisable only with difficulty are sodium acetate and closely related sodium-organic acid salts. These require the use of rather severe reaction conditions, i.e., high temperatures and high pressures, for complete decomposition and conversion to sodium carbonate. The additional contact between the substantially oxidised liquor in the decomposer and the incoming air at its full oxygen tenor is favourable to further oxidation of any such organic residues. The extent to which this occurs will depend inter alia on the effective contact time in the decomposer at the higher temperature levels since there will be a sharp temperature gradient from the liquor inlet to the liquor outlet of the decomposer unless means are adopted for supplying the decomposer with heat from other sources to balance the latent heat of evaporation.

Applicant has also found a means by which such heat may be conveniently supplied. In the above description of the invention it may be implied that the second pressure vessel or decomposer is a separate vessel and it is convenient to so consider it for simplicity of description. As a further development of the invention, which has the advantage of heat conservation, the decomposer can be constructionally integrated with the reactor in the form of concentric vessels since both units operate under the same total pressure. The concentric vessels may be connected internally and/or externally.

In this way one of the concentric vessels representing the decomposer can be maintained at any temperature up to substantially the maximum temperature in the second concentric vessel representing the reactor or oxidation vessel, the latter being a convenient source of heat by virtue of the highly exothermic oxidation reactions occurring therein. The temperature equilibrium which will be established between the two vessels will depend primarily on the effectiveness of heat transfer between the concentric vessels, the proportion of air or oxygenating gas entering the decomposer and the temperatures at which this gas and the oxidised liquor enter the decomposition vessel. In practice, if secondary exothermic oxidation reactions continue to a limited extent in the second or decomposition vessel, then these will also represent a minor heat input and a minor source of carbon dioxide, but the proportion of carbon dioxide resulting from these secondary reactions will be small and will not substantially detract from the effectiveness of the invention for removing the much larger amounts of dissolved or dispersed carbon dioxide present in the substantially oxidised liquor admitted to the decomposer.

If the equilibrium temperature in the decomposer in relation to the proportions of air and liquor entering the decomposer is such that excessive evaporation of water may be encountered which can be the case as the decomposer temperature tends toward the critical temperature of water, then additional preheated make-up water may be added to the decomposer from an external source.

In a further development of the invention, a suitable partial condensation system may be incorporated in the inter-connection carrying the oxygenating gas stream and water vapour from the decomposer to the reactor whereby a controlled proportion of the water vapour may be condensed and separated as hot water, thus controlling the water dilution to the reactor and the amount of preheat delivered to the reactor by the oxygenating gas stream.

It will be clear to those skilled in the art that in practice many combinations of temperature, auxiliary water input to the decomposer, and partial condensation of water vapour from the oxygenating gas stream leaving the decomposer, are possible in order to control the desired evaporation of water from the decomposer and are within the framework of the invention.

A further general objective of the invention is that the maximum temperature in the decomposer shall be as high as possible equal to or below the mean temperature in the reactor and in all cases below the critical temperature of water.

Applicant has found that to secure maximum oxidation of soda base black liquors with reaction times of sufficiently short duration for practical use, reaction temperatures in the reactor should be usually in excess of 600° F. and commonly of the order of 600° F.–625° F. At this order of temperatures the system must operate, for the normal proportions of air and liquor employed, at total pressures of the order of 200 atmospheres in order to prevent excessive evaporation of water by the air and/or non-condensible gases present in the oxygenating gas stream. It is to be noted that these temperatures and pressures are tending towards the critical temperature and critical pressure for water and are in a region where reliable physico-chemical data on the properties of the gaseous and vapour components has not previously been available.

Applicant has further found that calculations based on the known information relating to the partial pressure of gases and that any assumptions that the gases and vapours present in a wet combustion system behave substantially in accord with the ideal gas laws are insufficiently accurate for the purposes of this invention.

Figure 2:
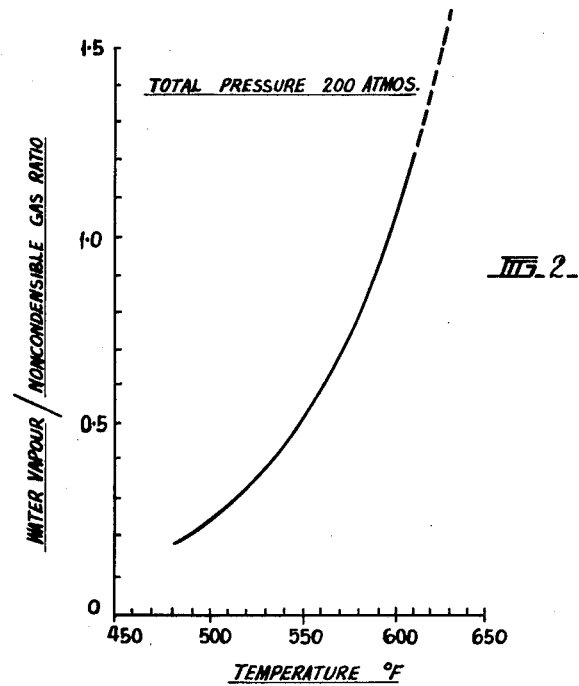

To assist in making the necessary calculations for the practical operation of the process of this invention, applicant has prepared the graphs shown in FIGURES 1 and 2 of the accompanying drawings, which reveal, respectively, relationships between equilibrium temperature and the water vapour to air ratio, and the water vapour to non-condensible gas ratio, specifically applicable to this invention when the system is operated under a total pressure of about 200 atmospheres. The non-condensible gas referred to in FIGURE 2 is of a chemical and volumetric composition comparable with that of the gas leaving separator B in the process described below with reference to FIGURE 3.

It can be shown that the water vapour/air ratio or the water vapour/non-condensible gas ratio, that is the evaporation quantity per unit of gas, and as read from FIGURE 1 or FIGURE 2, is substantially greater than would be predictable on the basis of known gas laws, and further that small but significant differences exist between the case for air and the case for the typical composition of non-condensible exhaust gas, particularly at higher temperatures. Thus the water vapour/air ratios of FIGURE 1 are specifically applicable to calculations of evaporation which occur in the decomposer, and the water vapour/non-condensible gas ratios of FIGURE 2 are particularly applicable to calculations of evaporation in the reactor and/or separator.

When operating either the reactor or decomposer of this invention at typical temperature levels of the order of 600° F. and with total pressures of the order of 200 atmospheres it will be clear from FIGURES 1 and 2 that precise measurement and control of the temperature is essential to maintain the desired rate of evaporation in view of the rapid rise of the water vapour/gas ratios as the temperature increases in the direction of the critical temperature for water.

It has been found that the employment of the highest possible maximum temperature in the decomposer, when measured at the gas/liquid interface, is advantageous in securing maximum lowering of the partial pressure of carbon dioxide in and above the liquid phase and in promoting maximum removal of the dissolved or dispersed carbon dioxide from this phase and thereby achieving the object of the invention. The temperature in the decomposer must necessarily be below the critical temperature of water (705.4° F.) and in the range from 450° F. to 705° F., and in practice is preferably between 600° F. and 625° F.

The highest practicable temperature below 705° F. is advantageously used in the decomposer vessel. The factors primarily governing the selection of this temperature are (a) The desired amount of evaporation in the decomposer, (b) The temperatures at which the oxidised liquor, air, and dilution water (if any), enter the decomposer, and (c) The availability of adequate heat from the exothermic oxidation reaction in the reactor or from other sources.

*Example*

Figure 3:
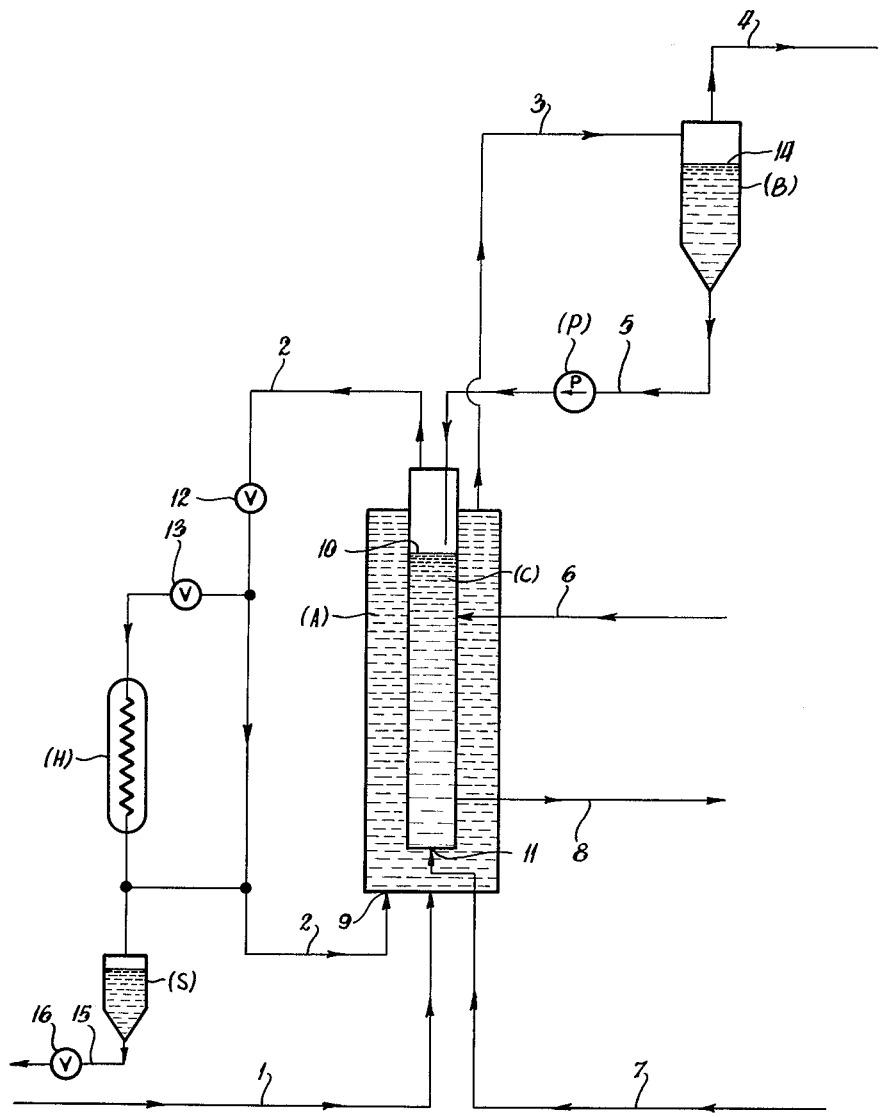

The following is a description of an example of the practical application of the process of this invention when carried out in the apparatus illustrated in FIGURE 3.

In this process, 36 lbs./hr. of black liquor from the soda process for the pulping of wood and comprising about 29.5 lbs. of water and about 6.5 lbs. of total dissolved solids with a calorific value of the order of 6000 B.t.u.'s per pound of total dissolved solids and preheated to about 275° F. is introduced continuously through pipe 1 to the base of a suitable reactor A. The reactor A represents the outer annular space of two cylindrical concentric vessels vertically arranged as shown in FIGURE 3; this outer annular space is hereinafter referred to as the reactor and the inner of the two concentric vessels (shown as C in FIGURE 3) is hereinafter referred to as the decomposer. These two vessels are interconnected via a third vessel B referred to herein as the separator. The interconnections between reactor A and decomposer C are, for the purposes of diagrammatic clarity, shown in FIGURE 3 to be external, but in practice may be partly internal. Separator B may if desired be constructionally integrated with the reactor A and the decomposer C. Further, the relative positions of the reactor A and decomposer C may be interchanged without departing from the concentric arrangement of these two vessels. The important feature of the concentric arrangement is that heat can pass freely between reactor A and decomposer C in either direction without the establishment of substantial temperature gradients across the dividing wall between the vessels, and that in practice both reactor A, decomposer C and separator B operate at substantially the same mean temperature when in equilibrium.

The 6.5 lbs./hr. of total dissolved solids contained in the black liquor consist of about 5.06 lbs. of organic material (containing about 47% carbon, about 46.5% combined oxygen and about 6.5% hydrogen) and about 0.88 lb. of sodium in combination with organic material, about 0.08 lb. of sodium hydroxide and about 0.47 lb. of sodium carbonate.

A mixture of oxygenating gas and water vapour (hereinafter termed "oxygenating gas") comprising about 23.7 lbs./hr. of nitrogen, about 7.15 lbs./hr. of oxygen, about 40.4 lbs./hr. of water and about 0.39 lbs./hr. of carbon dioxide is introduced continuously to the reactor A at its base via pipe 2 which is fitted with a suitable diffusion device (not shown) at the point 9 of entry to the reactor A. This oxygenating gas is effluent from the decomposer C originating from the gaseous phase above the controlled liquid level 10 in decomposer C and the said oxygenating gas leaves decomposer C and enters the base of reactor A substantially at a temperature of 608° F.

The mixed gases and liquor pass upwardly and concurrently through the reactor A, wherein oxidation of the organic material proceeds exothermally with the process controlled so that the equilibrium temperature is of the order of 608° F. and with the system maintained under a total pressure of about 3000 p.s.i.a. Substantially complete oxidation of the organic material in the black liquor occurs during its passage through reactor A, and about 2.4 lbs./hr. of water and about 8.2 lbs./hr. of carbon dioxide are formed as reaction products, but about 1.2 lbs./hr. of this carbon dioxide produced is chemically combined with sodium in the form of sodium carbonate and/or sodium bicarbonate or is partly in solution in the aqueous phase.

A large proportion of the exothermic heat of reaction generated in the reactor A is transferred by conduction and radiation to the decomposer C and its contents in such an amount that the liquid and gas in the decomposer C are maintained substantially at an equilibrium temperature of about 608° F., this temperature being measured at the interface 10 between the liquid and gaseous phases in decomposer C.

The mixed gases and substantially oxidised liquors leave the reactor A at or near the top via pipe 3 and at this point may be considered to be substantially in the form of a foam. Pipe 3 discharges the mixed gas/liquid foam to separator B which is fitted with suitable baffles or cyclonic devices (not shown) to aid separation of the gas and liquor into substantially discrete gas and liquid phases. Continuous separation occurs in separator B and the separated gaseous phase which comprises about 23.7 lbs./hr. of nitrogen, about 7.4 lbs./hr. of carbon dioxide, about 0.7 lb./hr. of oxygen and about 37.2 lbs./hr. of water vapour and is at a temperature of about 608° F. is vented to atmosphere substantially continuously via pipe 4 after suitable heat recuperation and under the control of a suitable device (not shown) to maintain the total back pressure on the system at about 3000 p.s.i.a.

The liquid phase separates in the lower section of separator B and is at a temperature of about 608° F. The separated liquid is transferred positively and continuously by means of a pump P and via pipe 5 to the decomposer C at a controlled rate such that a constant level 14 of liquid is continuously maintained in separator B. The liquid so transferred via pump P and pipe 5 comprises about 35 lbs./hr. of water, about 1.3 lbs./hr. of sodium carbonate, and sufficient dissolved or dispersed carbon dioxide to be equivalent to about 2.1 lbs./hr. of sodium bicarbonate if the carbon dioxide is regarded as fully combined chemically with the balance of the sodium present. The liquid may also contain lesser and minor amounts of unoxidised sodium salts of organic acids, e.g., sodium acetate or related compounds, and the proportion of these may slightly reduce the total sodium in the form of carbonate and/or bicarbonate but without significant effect on the relative proportions of sodium carbonate, sodium bicarbonate and/or dissolved or dispersed carbon dioxide.

The separated liquid enters decomposer C at a temperature of about 608° F. via pipe 5 at a point close to the controlled liquid level 10 in decomposer C. The liquid is caused to flow downwards in the decomposer C; and additional dilution water preheated to about 450° F. is also added to the decomposer C via pipe 6 at a rate of about 17.9 lbs./hr.

Air at a superatmospheric pressure of about 3000 p.s.i.a. and preheated to 450° F. is admitted continuously to decomposer C at its base via pipe 7 and via a suitable diffusion device (not shown) at point 11. The air is admitted to decomposer C at a rate of 30.9 lbs./hr. and passes upward countercurrently to the downflowing liquid in decomposer C.

This air, mixed with small amounts of carbon dioxide derived from the solution and/or from the decomposition of sodium bicarbonate and a considerable proportion of water vapour evaporated from the liquid (this mixture being referred to herein as oxygenating gas), separates from the liquid phase in the decomposer C at the level 10 at which the liquid is maintained in the decomposer C. Such predetermined level 10 is maintained by discharging the liquid from the base of the decomposer C at a rate controlled by an automatic device (not shown) sensing the level in the decomposer C. The liquid phase is discharged substantially continuously from the base of the decomposer C via pipe 8, cooled by any suitable means to a temperature at which it remains in liquid phase at ambient pressure and represents the desired product liquor. It comprises about 12.8 lbs./hr. of water, about 2.26 lbs./hr. of sodium carbonate, and about 0.58 lb./hr. of sodium bicarbonate or sufficient dissolved or dispersed carbon dioxide to form this latter amount of sodium bicarbonate on further cooling.

As previously described, the oxygenating gas leaving the top of the decomposer C passes via pipe 2 to the base of reactor A.

For the purposes of control the oxygenating gas passing through pipe 2 may be passed by means of valves 12 and 13 wholly or in part through a heat interchanger or cooler H associated with a condensate separator S to slightly reduce its temperature and thereby reduce its content of water vapour. A small reduction in temperature below 608° F. is sufficient to bring about a considerable condensation of water vapour, and the sensitivity of this control can be illustrated by reference to FIGURE 2 showing the relation between temperature and water vapour/gas ratio for a total pressure of about 3000 p.s.i.a. and for a typical composition in respect of non-condensible gaseous components. Such condensate as is collected in separator S is vented continuously to atmosphere via pipe 15 and valve 16 controlled by an automatic level sensing device (not shown).

It will be seen, therefore, that by the process of this invention as described in the above example, the sodium bicarbonate content of the liquor has been reduced from approximately 50% (calculated as equivalent sodium hydroxide) as it enters the decomposer C to approximately 13% (calculated similarly) as it leaves the decomposer C. This represents a reduction of approximately 26% in the quantity of calcium hydroxide theoretically required to causticise the sodium carbonate and sodium bicarbonate in (a) the liquor entering the decomposer and (b) the liquor leaving the decomposer. This represents a reduction of approximately 74% in the sodium bicarbonate content of the liquor, and it will be seen that the product liquor from this process (as described in the example) contains only about 13% sodium bicarbonate, as compared with the product of the normal dry combustion process (which contains a negligible quantity of sodium bicarbonate), so that the requirement of calcium hydroxide for causticisation in the case of applicant's process approaches the theoretical minimum much more closely than in the case of a wet combustion process not operated according to this invention.

I claim:

1. A continuous process for the wet oxidation of black liquor containing combustible organic materials and recoverable sodium values and obtained from the soda process for the pulping of wood wherein the black liquor is exothermically reacted with an oxygenating gas, which comprises passing the black liquor through a reaction vessel concurrently with a gaseous stream comprising oxygenating gas and carbon dioxide whereby organic constituents of the black liquor are oxidized, with the production of exothermic heat, to produce a reaction mixture comprising (a) gaseous phase including carbon dioxide and steam and (b) an aqueous oxidized liquor phase including in solution sodium combined with carbon dioxide and water; passing the reaction mixture from the reaction vessel to a separating vessel and therein separating the gaseous phase from the oxidized liquor; passing the separated oxidized liquor through a decomposition vessel at a temperature maintained at not less than 450° F. countercurrently to a stream of oxygenating gas substantially free from carbon dioxide thereby removing carbon dioxide from said oxidized liquor and simultaneously mixing the removed carbon dioxide with the stream of oxygenating gas thereby constituting the aforesaid gaseous stream comprising oxygenating gas and carbon dioxide, the extent of the removal of carbon dioxide being such that the ratio of carbon dioxide to sodium in the resulting liquor changes significantly in the direction of that represented in sodium carbonate.

2. A process as defined in claim 1, wherein the temperature and pressure in the decomposition vessel are substantially the same as those in the reaction vessel.

3. A process according to claim 1 wherein the temperature in the reaction vessel and in the decomposition vessel is between 600° F. and 625° F.

4. A process according to claim 1 wherein the pressure in the reaction vessel and in the decomposition vessel is approximately 200 atmospheres.

5. A process according to claim 2 wherein substantial equality of temperature in the two vessels is effected by surrounding one of said vessels with the other of said vessels and permitting free heat interchange therebetween.

6. A process according to claim 1 wherein the oxygenating gas, after leaving the decomposition vessel and before entering the reaction vessel, is passed through a cooling zone to slightly reduce its temperature and thereby reduce its content of water vapour.

References Cited by the Examiner

UNITED STATES PATENTS

| | | | |
|---|---|---|---|
| 2,640,758 | 6/53 | Aries | 23—129 |
| 2,726,927 | 12/55 | Bergstrom | 23—48 |

OTHER REFERENCES

Zimmerman, article in Chemical Engineering, Aug. 25, 1958, pp. 117–120.

MAURICE A. BRINDISI, *Primary Examiner.*